United States Patent
Kohli

(10) Patent No.: US 10,650,384 B2
(45) Date of Patent: May 12, 2020

(54) SYSTEMS AND METHODS FOR USING NETWORK DATA IN AN AUTOMATED DELIVERY SYSTEM

(71) Applicant: MasterCard International Incorporated, Purchase, NY (US)

(72) Inventor: Manoneet Kohli, O'Fallon, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 889 days.

(21) Appl. No.: 15/168,761

(22) Filed: May 31, 2016

(65) Prior Publication Data
US 2017/0344998 A1  Nov. 30, 2017

(51) Int. Cl.
*G06Q 10/08* (2012.01)
*G06Q 20/40* (2012.01)
*H04W 76/10* (2018.01)
*G06Q 30/06* (2012.01)
*H04L 12/26* (2006.01)
(Continued)

(52) U.S. Cl.
CPC ........ *G06Q 20/409* (2013.01); *G06Q 10/083* (2013.01); *G06Q 30/0601* (2013.01); *H04L 43/16* (2013.01); *H04L 61/2007* (2013.01); *H04L 61/6022* (2013.01); *H04W 12/08* (2013.01); *H04W 76/10* (2018.02)

(58) Field of Classification Search
CPC ...... G06Q 10/08; G06Q 30/06; G06Q 20/409; H04L 43/16; H04L 61/2007; H04L 61/6022; H04W 76/10; H04W 12/08
See application file for complete search history.

(56) References Cited

U.S. PATENT DOCUMENTS

| 7,822,618 B2 | 10/2010 | Kaneko |
| 7,870,999 B2 | 1/2011 | Skaaksrud et al. |

(Continued)

FOREIGN PATENT DOCUMENTS

WO  2012027748 A2  3/2012

OTHER PUBLICATIONS

Zhang, Feng, Aron Kondoro, and Sead Muftic. "Location-based authentication and authorization using smart phones." 2012 IEEE 11th International Conference on Trust, Security and Privacy in Computing and Communications. IEEE, 2012.*

(Continued)

*Primary Examiner* — Daniel Vetter
*Assistant Examiner* — Scott M Tungate
(74) *Attorney, Agent, or Firm* — Armstrong Teasdale LLP

(57) ABSTRACT

A computer-implemented method for using network data in an automated delivery system is provided. The method is implemented using a delivery validation server in communication with a memory. The method includes receiving an online order originating from a user computer device. The online order includes a delivery address and network information associated with a wireless network associated with the delivery address. The method also includes configuring a delivery device based on the network information and the delivery address, and receiving a delivery confirmation message transmitted from the delivery device through the wireless network associated with the delivery address. The delivery device is connected to the wireless network based on the network information.

21 Claims, 7 Drawing Sheets

(51) Int. Cl.
*H04L 29/12* (2006.01)
*H04W 12/08* (2009.01)

(56) References Cited

U.S. PATENT DOCUMENTS

| | | | |
|---|---|---|---|
| 8,775,669 | B2 | 7/2014 | Hutchinson |
| 9,211,025 | B1 | 12/2015 | Elhawwashy |
| 2005/0251402 | A1* | 11/2005 | Olsen, III .............. G06Q 10/08 705/336 |
| 2006/0069916 | A1* | 3/2006 | Jenisch ............... H04L 63/0846 713/172 |
| 2012/0072311 | A1 | 3/2012 | Khan |
| 2015/0081583 | A1 | 3/2015 | Butler et al. |
| 2015/0123794 | A1 | 5/2015 | Hamalainen et al. |
| 2015/0242810 | A1 | 8/2015 | Rifai |
| 2015/0348004 | A1* | 12/2015 | Eramian ............... G06F 16/951 705/40 |
| 2016/0048796 | A1* | 2/2016 | Todasco ............... G06Q 10/083 705/330 |
| 2016/0068264 | A1 | 3/2016 | Ganesh et al. |
| 2016/0096508 | A1 | 4/2016 | Oz et al. |
| 2016/0098670 | A1 | 4/2016 | Oz et al. |
| 2016/0098876 | A1 | 4/2016 | Oz et al. |
| 2016/0099927 | A1 | 4/2016 | Oz et al. |
| 2016/0104098 | A1* | 4/2016 | Matula ................ G06Q 10/083 701/23 |

OTHER PUBLICATIONS

PCT International Search Report and Written Opinion, Application No. PCT/US2017/028230, dated Jul. 11, 2017, 10 pps.

\* cited by examiner

SYSTEMS AND METHODS FOR USING NETWORK DATA IN AN AUTOMATED DELIVERY SYSTEM

BACKGROUND OF THE DISCLOSURE

The field of the disclosure relates generally to automated delivery systems, and more specifically to methods and systems for improving the accuracy of automated delivery systems and providing an additional confirmation of delivery by using network data.

In many cases, customers purchase products online for delivery. These products are shipped to an address designated by the customer, such as a home or business address. In some cases, a signature of someone at the address is required to complete the delivery. In other cases, the products are left in a safe or designated spot outside of/or nearby the delivery address by the delivery person. In some of these cases, the customer alleges that the product was never ordered, never delivered, and/or was delivered to the wrong address. Furthermore, in some situations delivery of products is performed by a drone or other automated device, which may complete delivery without interaction by a human delivery person. In all of these situations, it would be useful to have a confirmation of delivery that would bind the purchase to the customer to address the issues of purchase denial, chargebacks, and identity validations.

BRIEF DESCRIPTION OF THE DISCLOSURE

A computer-implemented method for using network data in an automated delivery system is provided. The method is implemented using a delivery validation server in communication with a memory. The method includes receiving an online order originating from a user computer device. The online order includes a delivery address and network information for a wireless network associated with the delivery address. The method also includes configuring a delivery device based on the network information and the delivery address and receiving a delivery confirmation message transmitted from the delivery device through the wireless network associated with the delivery address. The delivery device is connected to the wireless network based on the network information.

A delivery validation server for using network data in an automated delivery system is provided. The delivery validation server includes a processor communicatively coupled to a memory device. The processor is programmed to receive an online order originating from a user computer device. The online order includes a delivery address and network information for a wireless network associated with the delivery address. The processor is also configured to configure a delivery device based on the network information and the delivery address and receive a delivery confirmation message transmitted from the delivery device through the wireless network associated with the delivery address. The delivery device is connected to the wireless network based on the network information.

At least one non-transitory computer-readable storage media having computer-executable instructions embodied thereon is provided. When executed by a delivery validation server having at least one processor coupled to at least one memory device, the computer-executable instructions cause the processor to receive an online order originating from a user computer device. The online order includes a delivery address and network information for a wireless network associated with the delivery address. The computer-executable instructions also cause the processor to configure a delivery device based on the network information and the delivery address and receive a delivery confirmation message transmitted from the delivery device through the wireless network associated with the delivery address. The delivery device is connected to the wireless network based on the network information.

A method for validating delivery in an automated delivery system is provided. The method is implemented using a delivery device including at least one processor in communication with a memory. The delivery device includes a wireless module configured to connect to Wi-Fi networks. The method includes receiving delivery information for a package to be delivered from a delivery validation server. The delivery information includes a delivery address and network information for a wireless network associated with the delivery address. The method also includes configuring the wireless module based on the network information, receiving the package for delivery to the delivery address, travelling to the delivery address, scanning for one or more wireless signals associated with the wireless network based on the network information, connecting to the wireless network associated with the wireless signal based on the network information, delivering the package at the delivery address, and transmitting a delivery confirmation message to the delivery validation server via the wireless module through the wireless network.

An automated delivery system is provided. The system includes a delivery validation server including at least one processor in communication with at least one memory and a delivery device. The delivery device includes at least one processor in communication with at least one memory, a wireless module configured to connect to Wi-Fi networks, and a transportation means configured to transport a package to a location. The delivery validation server is configured to receive an online order originating from a user computer device. The online order includes a delivery address and network information for a wireless network associated with the delivery address. The delivery validation server is also configured to transmit delivery data based on the network information and the delivery address to a delivery device and receive a delivery confirmation message from the delivery device. The delivery confirmation message transmitted through the wireless network associated with the delivery address. The delivery device is configured to receive delivery data for the online order from the delivery validation server, configure the wireless module based on the network information, receive a package for delivery to the delivery address, travel to the delivery address, scan for one or more wireless signals associated with the wireless network based on the network information, connect to the wireless network associated with the wireless signal based on the network information via the wireless module, deliver the package at the delivery address, and transmit a delivery confirmation message to the delivery validation server via the wireless module through the wireless network.

BRIEF DESCRIPTION OF THE DRAWINGS

FIG. 1 is a schematic diagram illustrating an example multi-party transaction card industry system for enabling payment-by-card transactions in which merchants and card issuers do not need to have a one-to-one relationship.

FIG. 2 is a simplified block diagram of an example system for using network data in an automated delivery system.

FIG. 3 illustrates an example configuration of a client system shown in FIG. 2, in accordance with one embodiment of the present disclosure.

FIG. 4 illustrates an example configuration of a server system shown in FIG. 2, in accordance with one embodiment of the present disclosure.

FIG. 5 is a flow chart of a process for using network data in an automated delivery system using the system shown in FIG. 2.

FIG. 6 is a flow chart of a process for validating delivery in an automated delivery system using the system shown in FIG. 2.

FIG. 7 is a diagram of components of one or more example computing devices that may be used in the system shown in FIG. 2.

DETAILED DESCRIPTION OF THE DISCLOSURE

Figure 1:
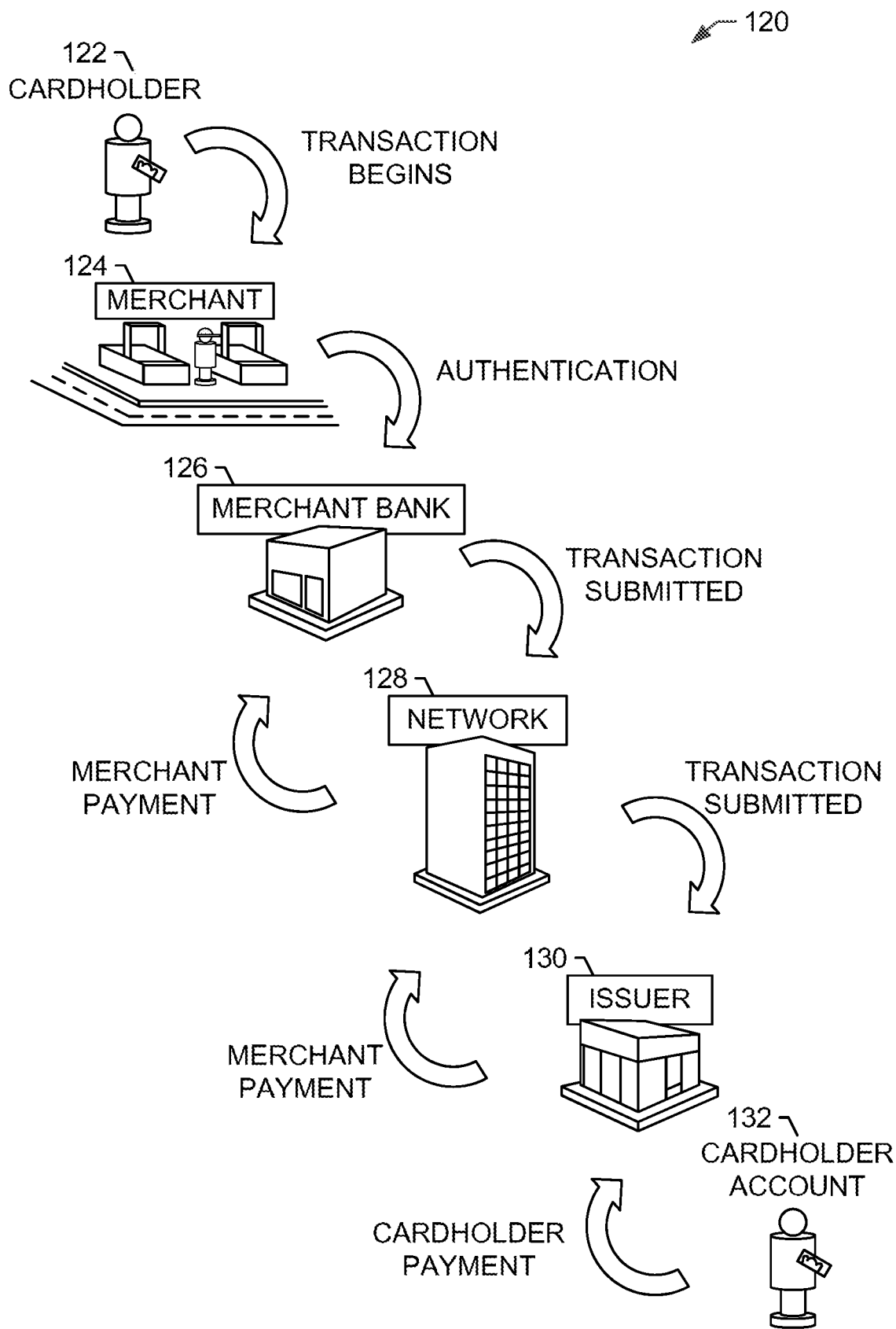
FIGS. 1-7 show example embodiments of the methods and systems described herein.

The following detailed description illustrates embodiments of the disclosure by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. These system and methods to improve the accuracy of automated delivery systems and provide an additional confirmation of delivery by using network data.

In the example embodiment, a delivery validation computer device (also known as a delivery validation server) includes a processor in communication with a memory. The verification computer device is in communication with a merchant and provides delivery services for the merchant.

In the example embodiment, the delivery validation server receives an online order placed by a cardholder. The online order originates from a cardholder computer device which is used by the cardholder to place the online order. In the example embodiment, the online order is a purchase order from the merchant for one or more products to be delivered to the cardholder at a delivery address. The online order also includes network information for a wireless network associated with the delivery address.

In the example embodiment, the cardholder uses the cardholder computer device to place an online order with an ecommerce website associated with the merchant. The cardholder computer device is connected to a cardholder router, such that the cardholder router routes information and data from the cardholder computer device to the Internet. In some embodiments, the cardholder computer device is wirelessly connected to the cardholder router through the wireless network associated with the cardholder router. In other embodiments, the cardholder computer device is connected to the cardholder router through a wired connection. In some embodiments, at least one computer device associated with the online order is able to determine network information about the wireless network from messages transmitted from the cardholder computer device to the website associated with the merchant. In some embodiments, the cardholder router includes a wireless access point for connecting wirelessly to computer devices. In other embodiments, the cardholder router and the wireless access point are separate devices, wherein the cardholder router and the wireless access point are connected via a computer network.

In some embodiments, the network information is captured by a payment processing network as a part of the authentication process. In other embodiments, the network information is captured by the merchant as a part of the ordering process. The payment processing network or the merchant stores the network information in a database. In some embodiments, the delivery validation server receives the network information directly from the cardholder or the merchant. In other embodiments, the delivery validation server receives the online order and retrieves the network information from the database. In some embodiments, the network information is stored from a prior online order from the cardholder.

In some embodiments, the network information also includes an Internet Protocol (IP) address associated with at least one of the cardholder computer device, the cardholder router, and the wireless access point. In these embodiments, the delivery validation server may validate the delivery address based on the IP address, where the IP address is associated with a physical area. In the example embodiment, the validation is performed by the payment processing network as a part of the authentication/authorization process.

In the example embodiment, the network information includes information for logging onto the wireless network associated with the cardholder router. In some embodiments, the network information may include, but is not limited to, the service set identification (SSID) of the wireless network, one or more IP addresses associated with the wireless network, a username and password for access to the wireless network, and a one-time use password for access to the wireless network.

In the example embodiment, the delivery validation server configures a delivery device based on the network information and the delivery address. The delivery device may be an automated delivery device, such as an aerial drone. The delivery device may also be a ground-based drone or a self-driving car. For example, the delivery validation server may transmit the delivery address and SSID of wireless network to the delivery device, thereby configuring the delivery device to travel to delivery address and scan for a wireless with the SSID provided in the network information when the delivery device is within a predetermined distance of the delivery address. Once configured, the delivery device transports the one or more products associated with the online order to the delivery address. If the delivery device is able to connect to the wireless network, then the delivery device delivers the one or more products to the delivery address.

In the example embodiment, the delivery validation server receives a delivery confirmation message from the delivery device. The delivery confirmation message is transmitted from delivery device through the wireless network to the cardholder router. The cardholder router routes the delivery confirmation message to the delivery validation server through the Internet. The delivery confirmation message includes the routing information showing that the delivery confirmation message was transmitted through the wireless network associated with the delivery address. In the example embodiment, the delivery device connected to wireless network by using the network information to connect to the cardholder router through wireless network.

In some other embodiments, the delivery validation server transmits a request to add the delivery device to the trusted device list for wireless network. In some of these embodiments, the delivery validation server transmits the request to the cardholder computer device for the cardholder to add to cardholder router's trusted device list. In other embodiments, the request includes a link that automatically adds the delivery device to the trusted device list stored by the cardholder router. In some of these embodiments, the request includes a media access control (MAC) address for the delivery device. As a part of configuring the delivery device, the delivery validation server configures the delivery device to have the MAC address included in the request. In still further embodiments, the MAC address is added to the trusted device list, and every time a delivery device delivers to delivery address, that delivery device is configured to use that MAC address. In some embodiments, a plurality of delivery devices is associated with the delivery validation server. Each time a delivery device is chosen to deliver a package, that delivery device is reconfigured for that specific delivery.

In those embodiments where the cardholder router and wireless access point are separate devices, the wireless access point would maintain the trusted device list. Furthermore, the delivery device would attempt to wirelessly connect to the wireless access point. In addition, the delivery confirmation message is routed from the delivery device, through the wireless access point to the cardholder router, wherein the cardholder router would route the delivery confirmation message to the delivery validation server.

In some embodiments, the delivery device is unable to connect to the wireless network at the delivery address. In these embodiments, the delivery device transmits a no connection message to delivery validation server indicating that the delivery device was unable to connect to wireless network. In some embodiments, the no connection message may indicate that the delivery device is unable to detect the network. In these embodiments, the delivery validation server may instruct delivery device to not complete the delivery. In other embodiments, the no connection message may include a signal strength of the wireless network detected by the delivery device. The delivery validation server may compare the received signal strength to a predetermined threshold. If the signal strength exceeds the predetermined threshold, then the delivery validation server may determine that the delivery device is at the right location and may instruct the delivery device to complete the delivery despite the delivery device being unable to access the wireless network.

In some further embodiments, the delivery validation server may store the delivery confirmation message, along with all of the routing data associated with it in the database. The delivery validation server may transmit a delivery confirmation message to the merchant indicated that delivery is complete and provide a level of assurance that the one or more products in the online order were delivered to the correct address. In some embodiments, the delivery confirmation message also includes a one-time code that is also stored in the database to confirm that the online order was delivered to the correct location.

In some embodiments, the delivery device is configured to scan for wireless signals. The delivery device is configured to determine the IP address associated with the wireless networks and compare the IP address with the network information. If the IP address matches, then the delivery device may be configured to deliver the package without logging onto the wireless network.

The methods and system described herein may be implemented using computer programming or engineering techniques including computer software, firmware, hardware, or any combination or subset. As disclosed above, at least one technical problem with prior systems is that there is a need for additional delivery confirmation for automated delivery systems. The system and methods described herein address that technical problem. The technical effect of the systems and processes described herein is achieved by performing at least one of the following steps: (a) receiving, at a delivery validation server, an online order originating from a user computer device, wherein the online order includes a delivery address and network information for a wireless network associated with the delivery address, wherein the network information includes a one-time use passcode to access the wireless network and an Internet Protocol (IP) address associated with at least one of the user computer device, the cardholder router, and the wireless access point, wherein the IP address associated with the user computer device is captured in an authentication process for a payment card transaction associated with the online order; (b) validating the delivery address based on the IP address; (c) transmitting, to the user computer device, a request to add the delivery device to a trusted device list associated with the wireless network, the request includes a media access control (MAC) address to add to the trusted device list; (d) configuring a delivery device based on the network information, the delivery address, the request, and the MAC address included in the request when accessing the wireless network; and (e) receiving, from the delivery device, a delivery confirmation message transmitted through the wireless network associated with the delivery address, wherein the delivery device is connected to the wireless network based on the network information, wherein the delivery device is configured to scan for the wireless network when the delivery device is within a predetermined distance of the delivery address. The resulting technical effect is that a more accurate delivery confirmation system provides a method of confirming delivery of a package or one or more ordered products.

Some additional technical effects include performing at least one of the following steps (a) receiving, from the delivery device, a no connection message indicating that the delivery device was unable to connect to the wireless network at the delivery address, wherein the no connection message includes a signal strength of the wireless network at the delivery address; (b) validating the delivery address based on the signal strength of the wireless network despite being unable to access the network; (c) instructing the delivery device to complete the delivery; and (d) when the no connection message indicates that the wireless network was not present at the delivery address, instructing the delivery device not to complete the delivery.

Further technical effects include performing at least one of (a) receiving, from a delivery validation server, delivery information for a package to be delivered, the delivery information includes a delivery address and network information for a wireless network associated with the delivery address; (b) configuring the wireless module based on the network information; (c) receiving the package for delivery to the delivery address; (d) travelling to the delivery address; (e) determining a current location of the delivery device; (f) determining a distance between the current location and the delivery address; (g) scanning for one or more wireless signal associated with the wireless network based on the network information based on the determined distance; (h) receiving at least one wireless signal associated with the wireless network; determining a strength of the wireless signal; (i) validating the delivery address based on the strength of the Wi-Fi exceeding a predetermined threshold; (j) connecting, via a wireless module, to the wireless network associated with the wireless signal based on the network information; (k) delivering the package at the delivery address; and (l) transmitting, via the wireless module through the wireless network, a delivery confirmation message to the delivery validation server.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, Smartphones, personal digital assistants (PDAs), key fobs, and/or computers. Each type of transactions card can be used as a method of payment for performing a transaction.

In one embodiment, a computer program is provided, and the program is embodied on a computer-readable medium. In an example embodiment, the system is executed on a single computer system, without requiring a connection to a server computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, Calif.). In yet a further embodiment, the system is run on a Mac OS® environment (Mac OS is a registered trademark of Apple Inc. located in Cupertino, Calif.). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer-readable medium and utilizes a Structured Query Language (SQL) with a client user interface front-end for administration and a web interface for standard user input and reports. In another embodiment, the system is web enabled and is run on a business entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Wash.). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the system and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

FIG. 1 is a schematic diagram illustrating an example multi-party transaction card industry system 120 for enabling payment-by-card transactions in which merchants 124 and card issuers 130 do not need to have a one-to-one relationship. Embodiments described herein may relate to a transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, N.Y.).

In a typical transaction card system, a financial institution called the "issuer" issues a transaction card or electronic payments account identifier, such as a credit card, to a consumer or cardholder 122, who uses the transaction card to tender payment for a purchase from a merchant 124. To accept payment with the transaction card, merchant 124 must normally establish an account with a financial institution that is part of the financial payment system. This financial institution is usually called the "merchant bank," the "acquiring bank," or the "acquirer." When cardholder 122 tenders payment for a purchase with a transaction card, merchant 124 requests authorization from a merchant bank 126 for the amount of the purchase. The request may be performed over the telephone, but is usually performed through the use of a point-of-sale terminal, which reads cardholder's 122 account information from a magnetic stripe, a chip, or embossed characters on the transaction card and communicates electronically with the transaction processing computers of merchant bank 126. Alternatively, merchant bank 126 may authorize a third party to perform transaction processing on its behalf. In this case, the pointof-sale terminal will be configured to communicate with the third party. Such a third party is usually called a "merchant processor," an "acquiring processor," or a "third party processor."

Using an interchange network 128, computers of merchant bank 126 or merchant processor will communicate with computers of an issuer bank 130 to determine whether cardholder's 122 account 132 is in good standing and whether the purchase is covered by cardholder's 122 available credit line. Based on these determinations, the request for authorization will be declined or accepted. If the request is accepted, an authorization code is issued to merchant 124.

When a request for authorization is accepted, the available credit line of cardholder's 122 account 132 is decreased. Normally, a charge for a payment card transaction is not posted immediately to cardholder's 122 account 132 because bankcard associations, such as MasterCard International Incorporated®, have promulgated rules that do not allow merchant 124 to charge, or "capture," a transaction until goods are shipped or services are delivered. However, with respect to at least some debit card transactions, a charge may be posted at the time of the transaction. When merchant 124 ships or delivers the goods or services, merchant 124 captures the transaction by, for example, appropriate data entry procedures on the point-of-sale terminal. This may include bundling of approved transactions daily for standard retail purchases. If cardholder 122 cancels a transaction before it is captured, a "void" is generated. If cardholder 122 returns goods after the transaction has been captured, a "credit" is generated. Interchange network 128 and/or issuer bank 130 stores the transaction card information, such as a category of merchant, a merchant identifier, a location where the transaction was completed, amount of purchase, date and time of transaction, in a database 220 (shown in FIG. 2).

After a purchase has been made, a clearing process occurs to transfer additional transaction data related to the purchase among the parties to the transaction, such as merchant bank 126, interchange network 128, and issuer bank 130. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction. In the example embodiment, when cardholder 122 purchases travel, such as airfare, a hotel stay, and/or a rental car, at least partial itinerary information is transmitted during the clearance process as transaction data. When interchange network 128 receives the itinerary information, interchange network 128 routes the itinerary information to database 220.

For debit card transactions, when a request for a personal identification number (PIN) authorization is approved by the issuer, cardholder's account 132 is decreased. Normally, a charge is posted immediately to cardholder's account 132. The payment card association then transmits the approval to the acquiring processor for distribution of goods/services or information, or cash in the case of an automated teller machine (ATM).

After a transaction is authorized and cleared, the transaction is settled among merchant 124, merchant bank 126, and issuer bank 130. Settlement refers to the transfer of financial data or funds among merchant's 124 account, merchant bank 126, and issuer bank 130 related to the transaction. Usually, transactions are captured and accumulated into a "batch," which is settled as a group. More specifically, a transaction is typically settled between issuer bank 130 and interchange network 128, and then between interchange network 128 and merchant bank 126, and then between merchant bank 126 and merchant 124.

Figure 2:
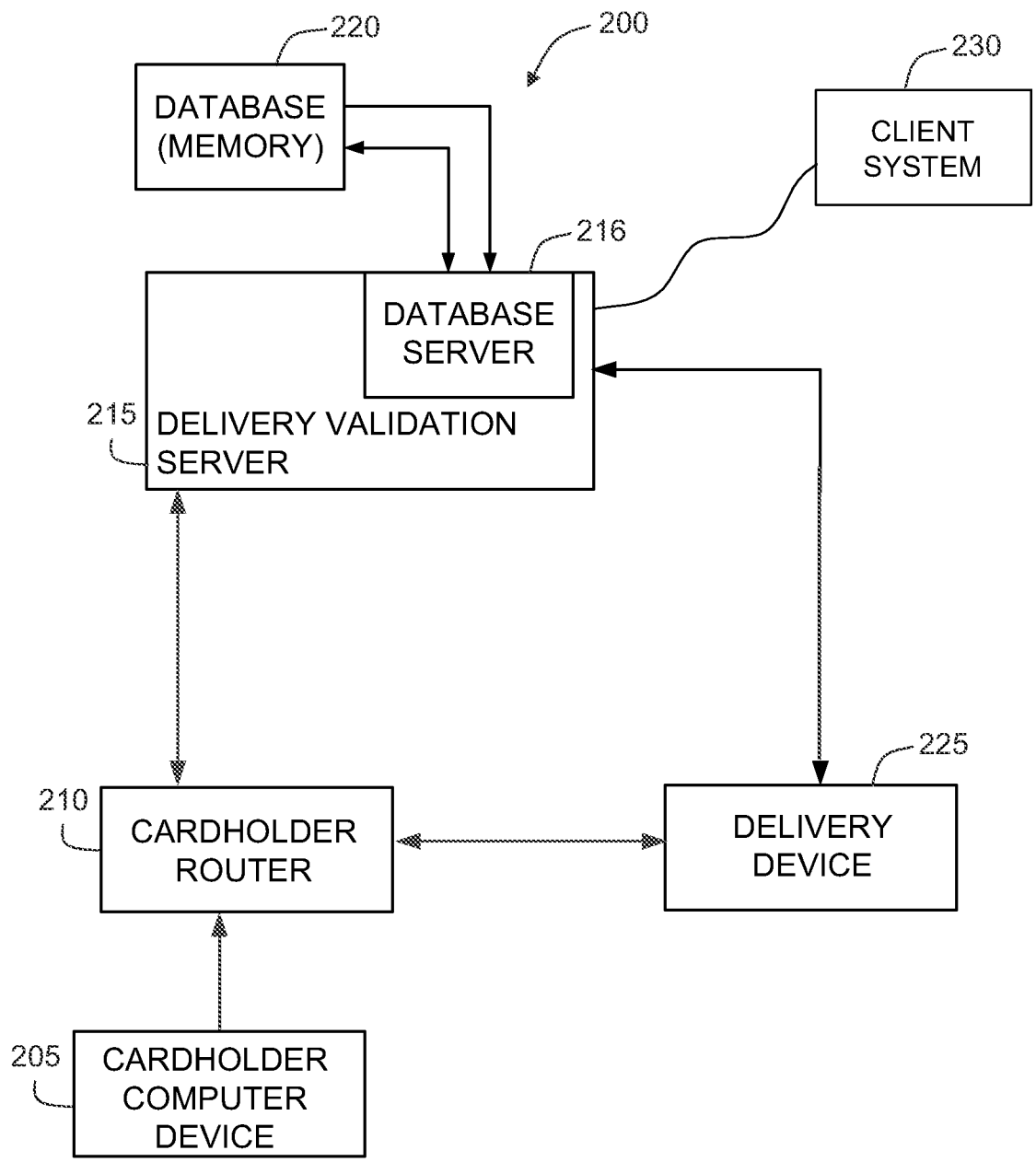

FIG. 2 is a simplified block diagram of an example system 200 for using network data in an automated delivery system. In the example embodiment, system 200 may be used for performing payment-by-card transactions received as part of processing cardholder transactions associated with orders of products for delivery. In addition, system 200 is a product delivery system that includes a delivery validation computer device 215 (also known as a delivery validation server 215) configured to confirm the automated delivery of product using network data. As described below in more detail, delivery validation server 215 is configured to receive an online order originating from a cardholder computer device 205, where the online order includes a delivery address and network information for a wireless network associated with the delivery address, configure a delivery device 225 based on the network information and the delivery address, and receive, from delivery device 225, a delivery confirmation message transmitted through the wireless network associated with the delivery address, where delivery device 225 connected to the wireless network based on the network information.

In the example embodiment, cardholder computer devices 205 are computers that include a web browser or a software application to enable cardholder computer devices 205 to access delivery validation server 215 using the Internet. More specifically, cardholder computer devices 205 are communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Cardholder computer device 205 can be any device capable of accessing the Internet including, but not limited to, a desktop computer, a laptop computer, a personal digital assistant (PDA), a cellular phone, a smartphone, a tablet, a phablet, or other web-based connectable equipment. In the example embodiment, cardholder 122 (shown in FIG. 1) uses a cardholder computer device 205 to access an ecommerce website for merchant 124 (shown in FIG. 1) to place orders and view the status of placed orders.

Cardholder router 210 is associated with cardholder computer device 205. In the example embodiment, cardholder router 210 is a wireless router, such as a Wi-Fi router. Cardholder router 210 projects a wireless network that allows computer devices, such as cardholder computer device 205, to wirelessly connect to cardholder router 210. In the example embodiment, cardholder router 205 is a gateway between cardholder computer device 205 and the Internet. In some embodiments, cardholder router 210 is a router at cardholder's residence. In other embodiments, cardholder router 210 is a router at cardholder's place of business. In the example embodiment, cardholder router 210 provides wireless Internet access at the location that cardholder 122 desires one or more products to be delivered to. In the example embodiment, cardholder router 210 is configured to function in a wireless-only LAN (WLAN) or in a mixed wired/wireless network. In the example embodiment, cardholder router 210 broadcasts its service set identifier (SSID). Cardholder router 210 is also configured to receive access requests from computer devices, such as cardholder computer device 205. In some embodiments, cardholder router 210 broadcasts an encrypted wireless network and requires user authentication, such as a username and password, before providing access. In these embodiments, cardholder router 210 may be encrypted using WEP, WPA, WPA2, WPA2-PSK, or any other encryption method. In further embodiments, cardholder router 210 only grants access to a predetermined list of computer devices, also known as a trusted device list. This list may be updated by cardholder 122, or another user, with access to cardholder router 210.

While in the example embodiment cardholder router 210 includes a wireless access point, in other embodiments, cardholder router 210 is separate from the wireless access point. In these embodiments, cardholder router 210 and wireless access point are in communication through one or more computer networks. As separate devices, cardholder router 210 and wireless access point would have different IP addresses and different MAC addresses. In some further embodiments, cardholder router 210 may be wirelessly connected to wireless access point as a client device. Wireless access point may include any portion of wireless network functionality necessary to work with cardholder router 210 as described herein.

A database server 216 is communicatively coupled to a database 220 that stores data. In one embodiment, database 220 includes online orders, delivery addresses, the network information, and delivery confirmation messages. In the example embodiment, database 220 is stored remotely from delivery validation server 215. In some embodiments, database 220 is decentralized. In the example embodiment, a person can access database 220 via a client system 230, or cardholder computer device 205, by logging onto delivery validation server 215, as described herein.

Delivery device 225 is self-driving vehicle capable of delivering one or more products. In some embodiments, delivery device 225 is an aerial drone. In other embodiments, delivery device 225 is a ground based drone, such as a self-driving automobile. In some embodiments, delivery device 225 is more than one automated device that work in concert to deliver a product to a location. In the example embodiment, delivery device 225 is communicatively coupled with delivery validation server 215. In the example embodiment, delivery device 225 includes a wireless communication module for connecting to wireless networks, such as the wireless network associated with cardholder router 210. In some embodiments, delivery device 225 also includes a cellular connection for communicating with delivery validation server 215. In some further embodiments, delivery device 225 also includes a wired connection for communicating with delivery validation server 215, such as for when delivery device 225 is plugged into a charging station (not shown). In some embodiments, a plurality of delivery devices 225 exists and is included in system 200. Each time a delivery device 225 is chosen to deliver a package, that delivery device 225 is reconfigured for that delivery. In the example embodiment, delivery device 225 includes a navigation module for determining its current location and determining one or more routes to a destination. In some embodiments, the navigation module includes a global positioning system (GPS) or some other positioning system that allows it to travel from one location to another.

In the example embodiment, delivery validation server 215 tracks and manages the delivery of products ordered from merchant 124. In some embodiments, delivery validation server 215 is associated with merchant 124. In some of these embodiments, delivery validation server 215 hosts an ecommerce website associated with merchant 124. In other embodiments, delivery validation server 215 is associated with at third party that provides delivery services for merchant 124. In some embodiments, delivery validation server 215 is associated with payment network. In other embodiments, delivery validation server 215 is merely in communication with payment network 120. Delivery validation server 215 is communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem.

In the example embodiment, client systems 230 are computers that include a web browser or a software application to enable client systems 230 to access delivery validation server 215 using the Internet. More specifically, client systems 230 are communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Client systems 230 can be any device capable of accessing the Internet including, but not limited to, a desktop computer, a laptop computer, a personal digital assistant (PDA), a cellular phone, a smartphone, a tablet, a phablet, or other web-based connectable equipment.

Figure 3:
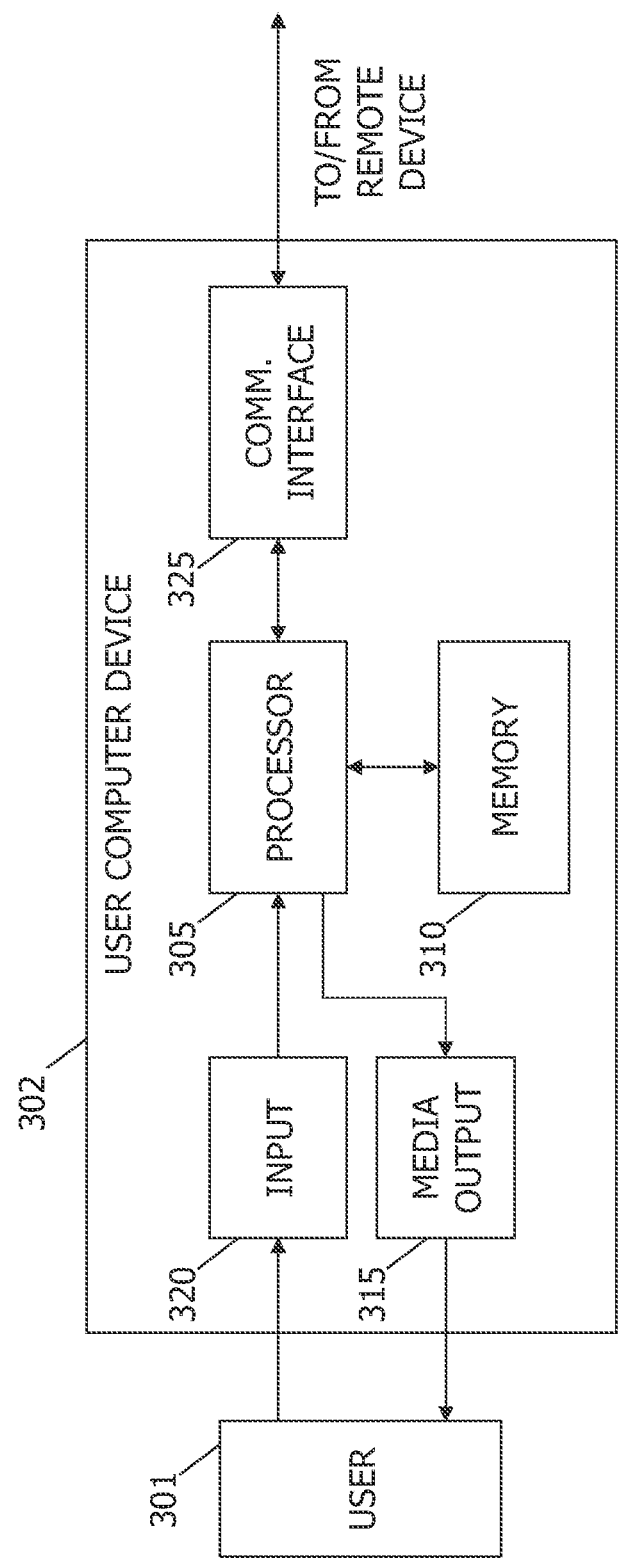

FIG. 3 illustrates an example configuration of client system 230 shown in FIG. 2, in accordance with one embodiment of the present disclosure. User computer device 302 is operated by a user 301. User computer device 302 may include, but is not limited to, cardholder computer device 205, delivery device 225, and client systems 230 (all shown in FIG. 1). User computer device 302 includes a processor 305 for executing instructions. In some embodiments, executable instructions are stored in a memory area 310. Processor 305 may include one or more processing units (e.g., in a multi-core configuration). Memory area 310 is any device allowing information such as executable instructions and/or transaction data to be stored and retrieved. Memory area 310 may include one or more computer-readable media.

User computer device 302 also includes at least one media output component 315 for presenting information to user 301. Media output component 315 is any component capable of conveying information to user 301. In some embodiments, media output component 315 includes an output adapter (not shown) such as a video adapter and/or an audio adapter. An output adapter is operatively coupled to processor 305 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 315 is configured to present a graphical user interface (e.g., a web browser and/or a client application) to user 301. A graphical user interface may include, for example, an online store interface for viewing and/or purchasing items, and/or a wallet application for managing payment information. In some embodiments, user computer device 302 includes an input device 320 for receiving input from user 301. User 301 may use input device 320 to, without limitation, select and/or enter one or more items to purchase and/or a purchase request, or to access credential information, and/or payment information. Input device 320 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 315 and input device 320.

User computer device 302 may also include a communication interface 325, communicatively coupled to a remote device such as delivery validation server 215 (shown in FIG. 2). Communication interface 325 may include, for example, a wired or wireless network adapter and/or a wireless data transceiver for use with a mobile telecommunications network.

Stored in memory area 310 are, for example, computer-readable instructions for providing a user interface to user 301 via media output component 315 and, optionally, receiving and processing input from input device 320. The user interface may include, among other possibilities, a web browser and/or a client application. Web browsers enable users, such as user 301, to display and interact with media and other information typically embedded on a web page or a website from delivery validation server 215. A client application allows user 301 to interact with, for example, delivery validation server 215. For example, instructions may be stored by a cloud service and the output of the execution of the instructions sent to the media output component 315.

Figure 6:
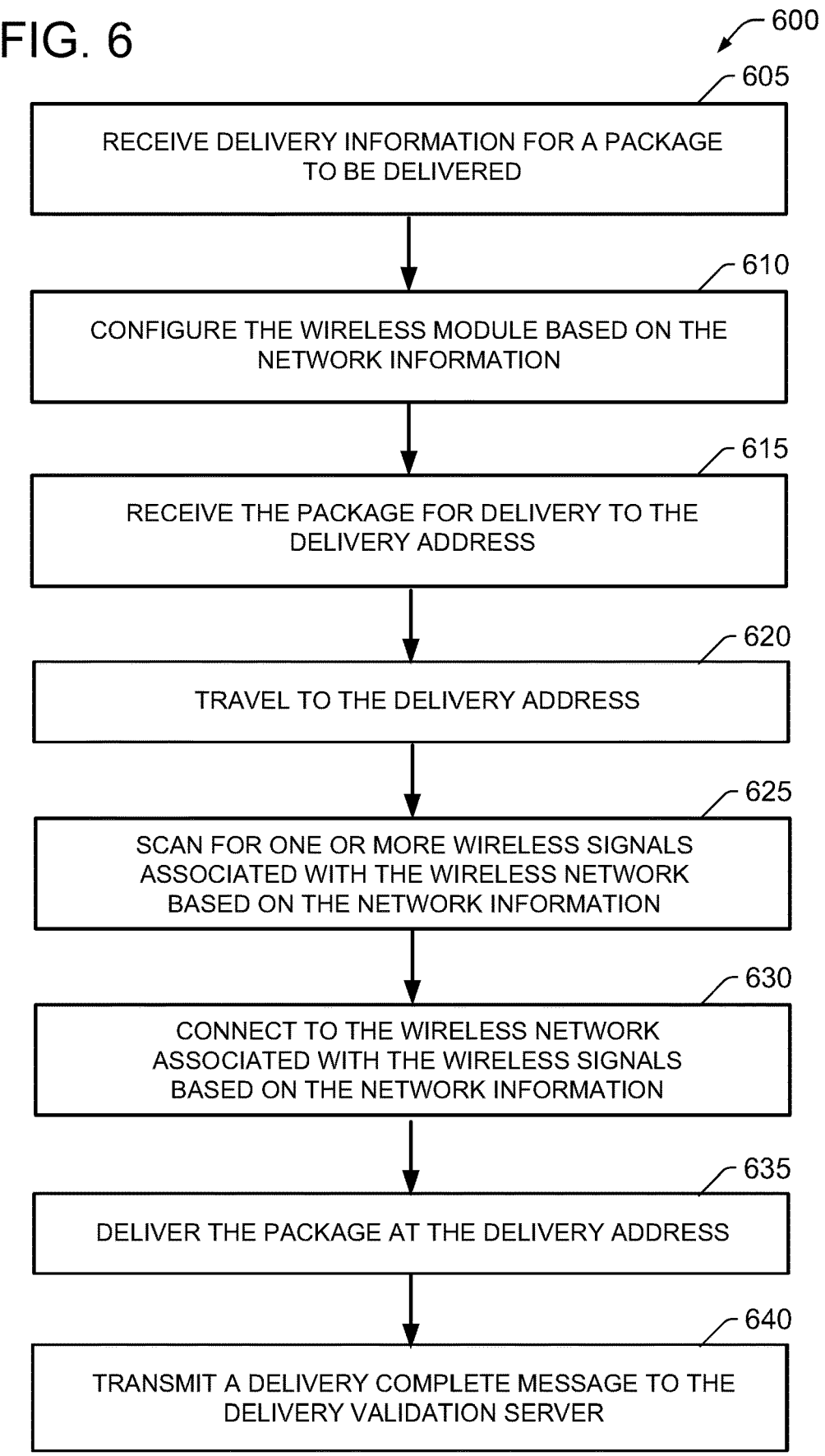

Processor 305 executes computer-executable instructions for implementing aspects of the disclosure. In some embodiments, processor 305 is transformed into a special purpose microprocessor by executing computer-executable instructions or by otherwise being programmed. For example, processor 305 is programmed with the instructions such as are illustrated in FIG. 6.

Figure 4:
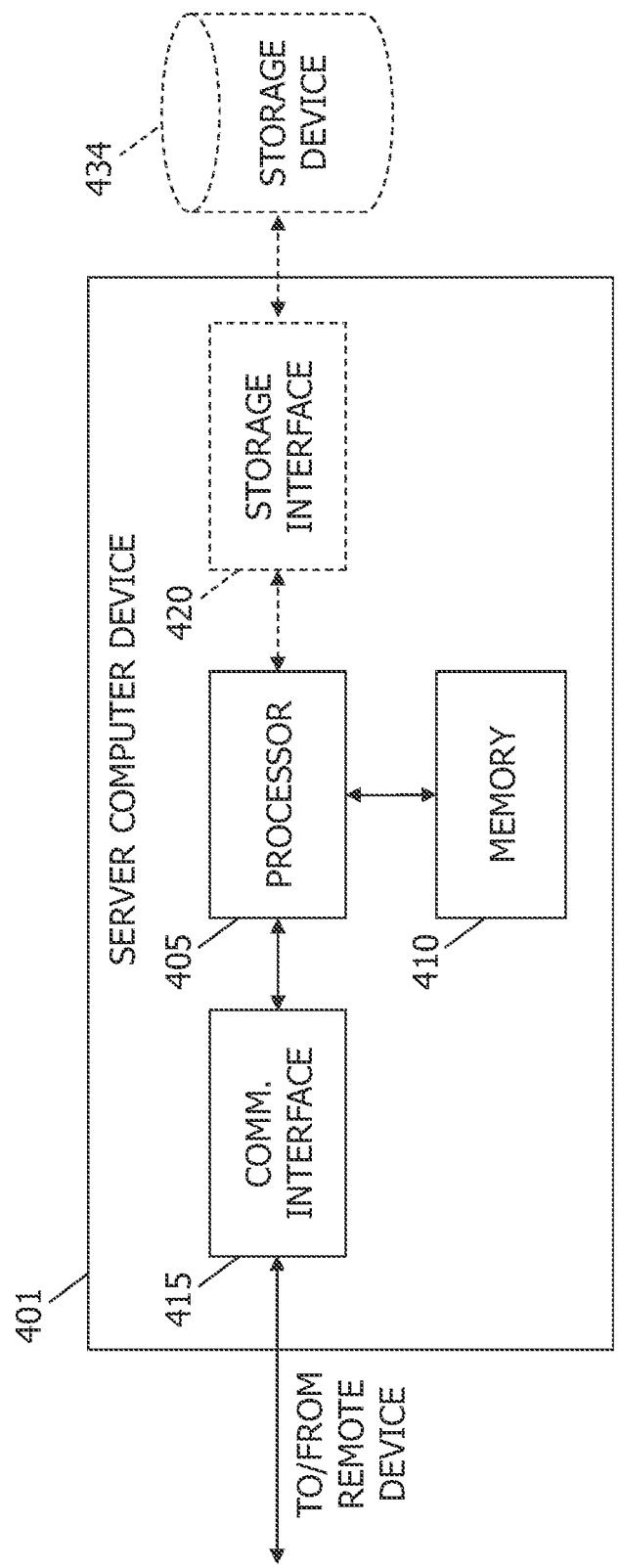

FIG. 4 illustrates an example configuration of a server system shown in FIG. 2, in accordance with one embodiment of the present disclosure. Server computer device 401 may include, but is not limited to, database server 216 and delivery validation server 215 (both shown in FIG. 2). Server computer device 401 also includes a processor 405 for executing instructions. Instructions may be stored in a memory area 410. Processor 405 may include one or more processing units (e.g., in a multi-core configuration).

Processor 405 is operatively coupled to a communication interface 415 such that server computer device 401 is capable of communicating with a remote device such as another server computer device 401, client systems 230, cardholder computer devices 205, cardholder routers 210, delivery devices 225, or delivery validation server 215 (all shown in FIG. 2). For example, communication interface 415 may receive requests from client system 230 via the Internet.

Processor 405 may also be operatively coupled to a storage device 434. Storage device 434 is any computer-operated hardware suitable for storing and/or retrieving data, such as, but not limited to, data associated with database 220 (shown in FIG. 2). In some embodiments, storage device 434 is integrated in server computer device 401. For example, server computer device 401 may include one or more hard disk drives as storage device 434. In other embodiments, storage device 434 is external to server computer device 401 and may be accessed by a plurality of server computer devices 401. For example, storage device 434 may include a storage area network (SAN), a network attached storage (NAS) system, and/or multiple storage units such as hard disks and/or solid state disks in a redundant array of inexpensive disks (RAID) configuration.

In some embodiments, processor 405 is operatively coupled to storage device 434 via a storage interface 420. Storage interface 420 is any component capable of providing processor 405 with access to storage device 434. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 434.

Processor 405 executes computer-executable instructions for implementing aspects of the disclosure. In some embodiments, processor 405 is transformed into a special purpose microprocessor by executing computer-executable instructions or by otherwise being programmed. For example, processor 405 is programmed with the instructions such as are illustrated in FIG. 5.

Figure 5:
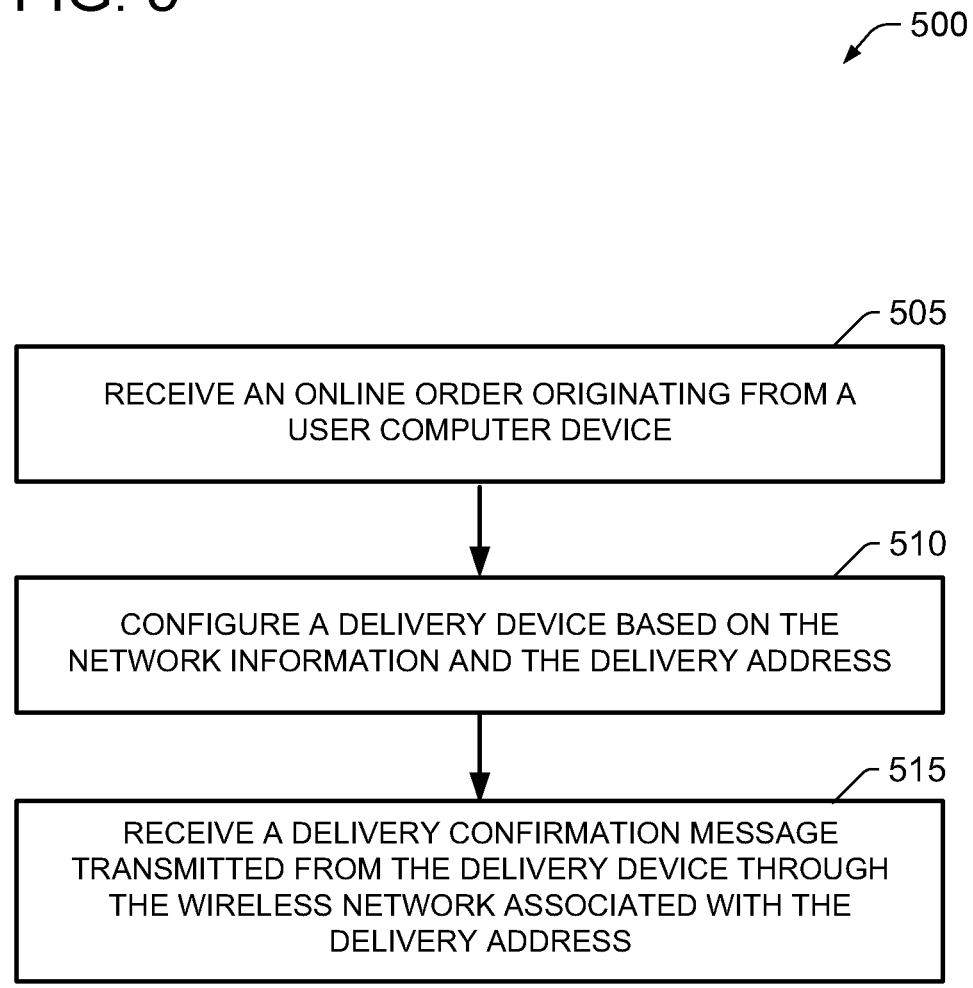

FIG. 5 is a flow chart of a process 500 for using network data in an automated delivery system using system 200 shown in FIG. 2. In the example embodiment, process 500 is performed by delivery validation server 215 (shown in FIG. 2).

In the example embodiment, delivery validation server 215 receives 505 an online order placed by cardholder 122 (shown in FIG. 1). The online order originates from a user computer device, such as cardholder computer device 205 (shown in FIG. 2), which is used by cardholder 122 to place the online order. In the example embodiment, the online order is a purchase order from a merchant 124 (shown in FIG. 1) for one or more products to be delivered to cardholder 122 at a delivery address. The online order also includes network information for a wireless network associated with the delivery address.

In the example embodiment, cardholder 122 uses cardholder computer device 205 (shown in FIG. 2) to place an online order with an ecommerce website associated with merchant 124. Cardholder computer device 205 is connected to cardholder router 210 (shown in FIG. 1), such that cardholder router 210 routes information and data from cardholder computer device 205 to the Internet. In some embodiments, cardholder computer device 205 is wirelessly connected to cardholder router 210 through the wireless network associated with cardholder router 210. In other embodiments, cardholder computer device 205 is connected to cardholder router 210 through a wired connection. In some embodiments, at least one computer device associated with the online order is able to determine network information about the wireless network from messages transmitted from cardholder computer device 205 to the website associated with the merchant. In some embodiments, cardholder router 210 includes a wireless access point for connecting wirelessly to computer devices. In other embodiments, cardholder router 210 and the wireless access point are separate devices, wherein cardholder router 210 and the wireless access point are connected via a computer network.

In some embodiments, the network information is captured by payment processing network 120 (shown in FIG. 1) as a part of the authentication process. In other embodiments, the network information is captured by merchant 124 as a part of the ordering process. Payment processing network 120 or merchant 124 stores the network information in database 220 (shown in FIG. 2). In some embodiments, delivery validation server 215 receives 505 the network information directly from cardholder 122 or merchant 124. In other embodiments, delivery validation server 215 receives 505 the online order and retrieves the network information from database 220. In some embodiments, the network information is stored from a prior online order from cardholder 122.

In some embodiments, the network information also includes an Internet Protocol (IP) address associated with at least one of cardholder computer device 205, cardholder router 210, and the wireless access point cardholder. In these embodiments, delivery validation server 215 may validate the delivery address based on the IP address, where the IP address is associated with a physical area. In the example embodiment, the validation is performed by the payment processing network 120 as a part of the authentication/authorization process.

In the example embodiment, the network information includes information for logging onto the wireless network associated with cardholder router 210. In some embodiments, the network information may include, but is not limited to, the service set identification (SSID) of the wireless network, one or more IP addresses associated with the wireless network, a username and password for access to the wireless network, and a one-time use password for access to the wireless network.

In the example embodiment, delivery validation server 215 configures 510 delivery device 225 (shown in FIG. 2) based on the network information and the delivery address. For example, delivery validation server 215 may transmit the delivery address and SSID of wireless network to delivery device 225, thereby configuring delivery device 225 to travel to delivery address and scan for a wireless with the SSID provided in the network information when delivery device 225 is within a predetermined distance of the delivery address. Once configured, delivery device 225 transports the one or more products associated with the online order to the delivery address. If delivery device 225 is able to connect to the wireless network, then delivery device 225 delivers the one or more products to the delivery address.

In the example embodiment, delivery validation server 215 receives 515 a delivery confirmation message from delivery device 225. The delivery confirmation message is transmitted from delivery device 225 through wireless network to cardholder router 210. Cardholder router 210 routes the delivery confirmation message to delivery validation server 215 through the Internet. The delivery confirmation message includes the routing information showing that the delivery confirmation message was transmitted through the wireless network associated with the delivery address. In the example embodiment, delivery device 225 connected to wireless network by using the network information to connect to cardholder router 210 through wireless network.

In some other embodiments, delivery validation server 215 transmits a request to add delivery device 225 to the trusted device list for wireless network. In some of these embodiments, delivery validation server 215 transmits the request to cardholder computer device 205 for cardholder 122 to add to cardholder router's trusted device list. In other embodiments, the request includes a link that automatically adds delivery device 225 to the trusted device list stored by cardholder router 210. In some of these embodiments, the request includes a media access control (MAC) address for delivery device 225. As a part of configuring 510 delivery device 225, delivery validation server 215 configures 510 delivery device 225 to have the MAC address included in the request. In still further embodiments, the MAC address is added to the trusted device list, and every time a delivery device 225 delivers to delivery address, that delivery device 225 is configured to use that MAC address. In some embodiments, a plurality of delivery devices 225 is associated with delivery validation server 215. Each time a delivery device 225 is chosen to deliver a package, that delivery device 225 is reconfigured for that specific delivery.

In those embodiments where cardholder router 210 and wireless access point are separate devices, the wireless access point would maintain the trusted device list. Furthermore, delivery device 225 would attempt to wirelessly connect to the wireless access point. In addition, the delivery confirmation message is routed from delivery device 225, through the wireless access point to cardholder router 210, wherein cardholder router 210 would route the delivery confirmation message to delivery validation server 215.

In some embodiments, delivery device 225 is unable to connect to the wireless network at the delivery address. In these embodiments, delivery device 225 transmits a no connection message to delivery validation server indicating that delivery device 225 was unable to connect to wireless network. In some embodiments, the no connection message may indicate that delivery device 225 is unable to detect the network. In these embodiments, delivery validation server 215 may instruct delivery device to not complete the delivery. In other embodiments, the no connection message may include a signal strength of the wireless network detected by delivery device 225. Delivery validation server 215 may compare the received signal strength to a predetermined threshold. If the signal strength exceeds the predetermined threshold, then delivery validation server 215 may determine that delivery device 225 is at the right location and may instruct delivery device 225 to complete the delivery despite delivery device 225 being unable to access the wireless network.

In some further embodiments, delivery validation server 215 may store the delivery confirmation message, along with all of the routing data associated with it in database 220. Delivery validation server 215 may transmit a delivery complete message to merchant 124 indicated that delivery is complete and provide a level of assurance that the one or more products in the online order were delivered to the correct address. In some embodiments, the delivery confirmation message also includes a one-time code that is also stored in database 220 to confirm that the online order was delivered to the correct location.

In some embodiments, delivery device 225 is configured to scan for wireless signals. Delivery device 225 is configured to determine the IP address associated with the wireless networks and compare the IP address with the network information. If the IP address matches, then delivery device 225 may be configured to deliver the package without logging onto the wireless network.

FIG. 6 is a flow chart of a process 600 for validating delivery in an automated delivery system using system 200 shown in FIG. 2. In the example embodiment, process 600 is performed by a delivery device 225 (shown in FIG. 2).

In the example embodiment, delivery device 225 receives 605 delivery information for a package to be delivered from delivery validation server 215 (shown in FIG. 2). The delivery information includes a delivery address and network information for a wireless network associated with the delivery address. The network information may include, but is not limited to, the service set identification (SSID) of the wireless network, a username and password for access to the wireless network, a one-time use password for access to the wireless network, and a MAC address for delivery device 225 when accessing wireless network.

Delivery device 225 includes a wireless module, such as communication interface 325 (shown in FIG. 3). Delivery device 225 configures 610 the wireless module based on the network information. For example, delivery device 225 may configure 610 the wireless module to use the MAC address provided in the network information.

Delivery device 225 receives 615 the package to be delivered to delivery address. Delivery device 225 travels to the delivery address. In the example embodiment, delivery device 225 scans 625 for one or more wireless signals, such as a Wi-Fi signal, associated with wireless network. In some embodiments, delivery device 225 scans 625 for wireless network by looking at the SSID of wireless networks that wireless module detects. In other embodiments, delivery device 225 scans 625 for wireless signals associated with the IP address. In some embodiments, delivery device 225 analyzes the signal strength of the wireless signals.

When delivery device 225 detects the wireless network from network information, delivery device 225 connects 630 to the wireless network. In the example embodiment, delivery device 225 transmits a connection request through wireless network to cardholder router 210. In the example embodiment, the connection request includes information from the network information, such as a username and password to login to the wireless network. Upon successfully connecting to wireless network and the associated cardholder router 210, delivery device 225 considers itself to be at the correct delivery location, aka the delivery address. In the example embodiment, delivery device 225 delivers 635 the package.

In the example embodiment, delivery device 225 transmits 640 a delivery confirmation message through the wireless network and cardholder router 210 to delivery validation server 215. The delivery confirmation message includes the routing information showing that the delivery confirmation message was transmitted through the wireless network associated with the delivery address.

In some embodiments, delivery device 225 receives one or more wireless signals associated with the wireless network. Delivery device 225 determines a strength of the wireless signals associated with the wireless network. Based on the strength of the wireless signals, delivery device 225 determines whether the delivery address is correct. For example, delivery device 225 analyzes the strength of the wireless signals and determines since the wireless signals are strong, delivery device 225 is physically close to cardholder router 210. Since cardholder router 210 is associated with delivery address, delivery device 225 determines that it is at the correct delivery address. In these embodiments, delivery device 225 may be configured to measure the signal strength at multiple locations to triangulate the location of cardholder router 210 to compare to the delivery address.

In some embodiments, delivery device 225 begins scanning 625 for wireless signals associated with wireless network prior to reaching delivery address. In these embodiments, delivery device 225 starts scanning 625 a predetermined distance from delivery address. In these embodiments, delivery device 225 determines its current location, such as via a GPS. Then delivery device 225 determines a distance between its current location and the delivery address. Then delivery device 225 begins scanning when the determined distance is less than a predetermined threshold. In some further embodiments, delivery device 225 may use the strength of wireless signals associated with the wireless network as an additional check to determine its current position.

In some further embodiments, delivery device 225 also includes a cellular module for communicating with delivery validation server 215 while delivery device 225 is traveling. Delivery device 225 may receive additional information about online order through the cellular module. Additionally, delivery device 225 may use the cellular module to communicate with delivery validation server 215 when problems occur, such as if delivery device 225 is unable to connect to or find the wireless network.

Figure 7:
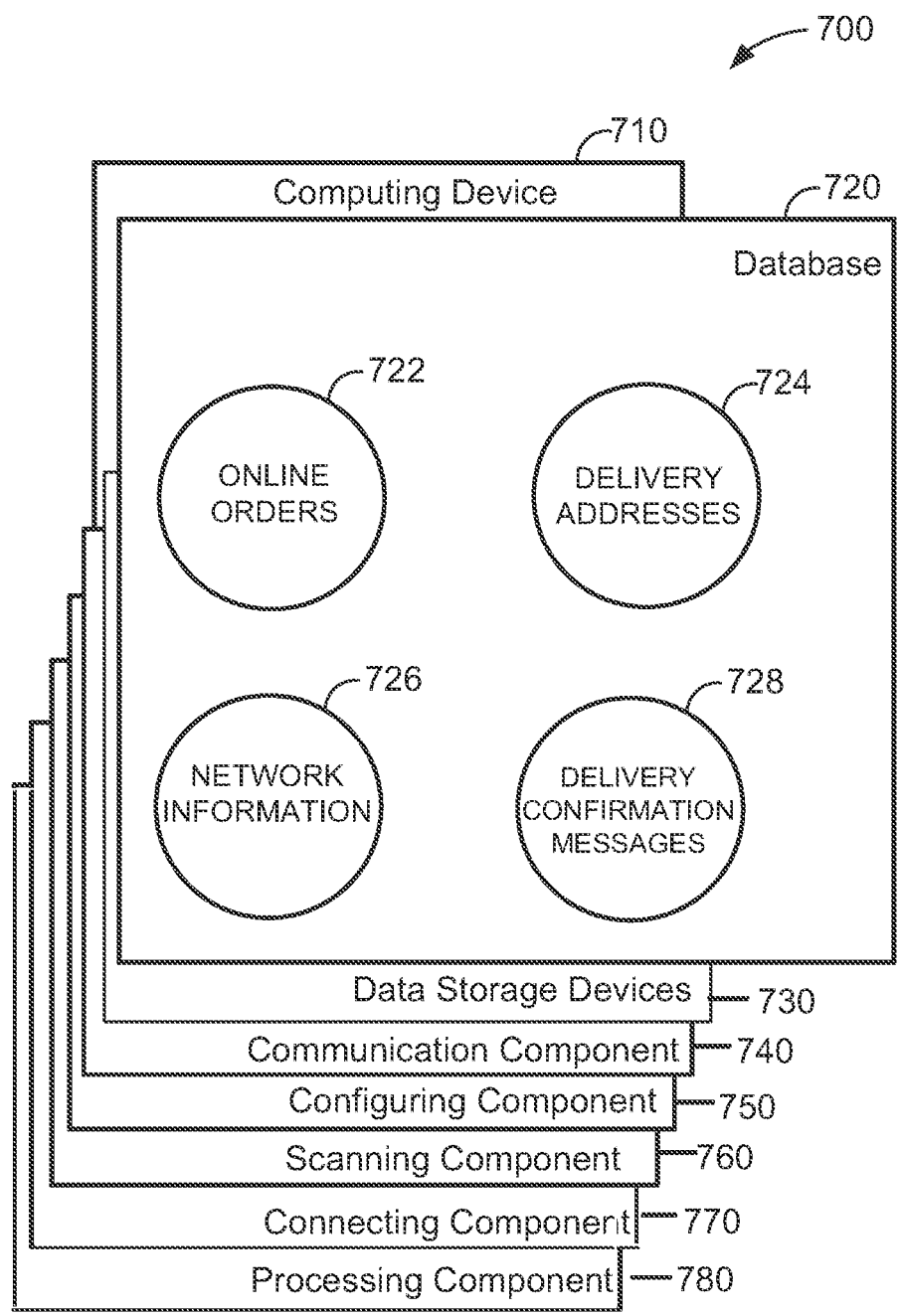

FIG. 7 is a diagram 700 of components of one or more example computing devices that may be used in system 200 shown in FIG. 2. In some embodiments, computing device 710 is similar to delivery validation server 215 (shown in FIG. 2). Database 720 may be coupled with several separate components within computing device 710, which perform specific tasks. In this embodiment, database 720 includes online orders 722, delivery addresses 724, network information 726, and delivery confirmation messages 728. In some embodiments, database 720 is similar to database 220 (shown in FIG. 2).

Computing device 710 includes database 720, as well as data storage devices 730. Computing device 710 also includes a communication component 740 for receiving 505 an online order, receiving 515 a delivery confirmation (both shown in FIG. 5), receiving 605 delivery information, and transmitting 640 a delivery confirmation message (both shown in FIG. 6). Computing device 710 also includes a configuring component 750 for configuring 510 a delivery device (shown in FIG. 5) and configuring 610 a wireless module (shown in FIG. 6). Computing device 710 further includes a scanning component 760 for scanning 625 for one or more wireless signals (shown in FIG. 6). Moreover, computing device 710 includes a connecting component 770 for connecting 630 to the wireless component (shown in FIG. 6). A processing component 780 assists with execution of computer-executable instructions associated with the system.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial locational differences from the literal languages of the claims.

What is claimed is:

1. A computer-based method for using network data in an automated delivery system, said method implemented using a delivery validation server in communication with a memory, said method comprising:
receiving, at the delivery validation server, an online order originating from a user computer device, wherein the online order includes a delivery address and network information for a wireless network associated with the delivery address;
configuring a delivery device to communicate with the wireless network associated with the delivery address by transmitting the network information and the delivery address from the delivery validation server to the delivery device, wherein the delivery device is configured to travel to the delivery address and connect to the wireless network associated with the delivery address using the network information included in the online order and transmitted from the delivery validation server to the delivery device; and
receiving, from the delivery device, a delivery confirmation message transmitted through the wireless network associated with the delivery address, wherein the delivery confirmation message is transmitted from the delivery device to the wireless network and routed from the wireless network to the delivery validation server via the Internet, and wherein the delivery confirmation message includes routing information indicating that the delivery confirmation message was transmitted through the wireless network, thereby confirming that the delivery device connected to the wireless network using the network information included in the online order and transmitted from the delivery validation server to the delivery device.

2. The method in accordance with claim 1 further comprising:
transmitting, to the user computer device, a request to add the delivery device to a trusted device list associated with the wireless network; and
further configuring the delivery device based on the request.

3. The method in accordance with claim 2, wherein the request includes a media access control (MAC) address to add to the trusted device list and wherein configuring the delivery device further comprises configuring a wireless module associated with the delivery device to use the MAC address included in the request when accessing the wireless network.

4. The method in accordance with claim 1, wherein the network information includes a one-time use passcode to access the wireless network.

5. The method in accordance with claim 1, wherein the network information includes an Internet Protocol (IP) address associated with at least one of the user computer device, a cardholder router, and a wireless access point and wherein the method further comprises validating the delivery address based on the IP address.

6. The method in accordance with claim 5, wherein the IP address associated with the user computer device is captured in an authentication process for a payment card transaction associated with the online order.

7. The method in accordance with claim 1 further comprising receiving, from the delivery device, a no connection message indicating that the delivery device was unable to connect to the wireless network at the delivery address.

8. The method in accordance with claim 7, wherein the no connection message includes a signal strength of the wireless network at the delivery address and wherein the method further comprises:
validating the delivery address based upon at least the signal strength of the wireless network detected by the delivery device; and
instructing the delivery device to complete the delivery despite the delivery device being unable to access the wireless network.

9. The method in accordance with claim 7, wherein the no connection message indicates that the wireless network was not present at the delivery address and wherein the method further includes instructing the delivery device not to complete the delivery.

10. The method in accordance with claim 1, wherein the network information included in the online order and transmitted from the delivery validation server to the delivery device includes a username and password for accessing the wireless network.

11. A delivery validation server for using network data in an automated delivery system, said delivery validation server comprising one or more processors communicatively coupled to one or more memory devices, said processor programmed to:
receive an online order originating from a user computer device, wherein the online order includes a delivery address and network information for a wireless network associated with the delivery address;
configure a delivery device to communicate with the wireless network associated with the delivery address by transmitting the network information and the delivery address from the delivery validation server to the delivery device, wherein the delivery device is configured to travel to the delivery address and connect to the wireless network associated with the delivery address using the network information included in the online order and transmitted from the delivery validation server to the delivery device; and
receive, from the delivery device, a delivery confirmation message transmitted through the wireless network associated with the delivery address, wherein the delivery confirmation message is transmitted from the delivery device to the wireless network and routed from the wireless network to the delivery validation server via the Internet, and wherein the delivery confirmation message includes routing information indicating that the delivery confirmation message was transmitted through the wireless network, thereby confirming that the delivery device connected to the wireless network using the network information included in the online order and transmitted from the delivery validation server to the delivery device.

12. The delivery validation server in accordance with claim 11, wherein the processor is further programmed to:

transmit, to the user computer device, a request to add the delivery device to a trusted device list associated with the wireless network; and further configure the delivery device based on the request.

13. The delivery validation server in accordance with claim 12, wherein the request includes a media access control (MAC) address to add to the trusted device list and the processor is further programmed to configure a wireless module associated with the delivery device to use the MAC address included in the request when accessing the wireless network.

14. The delivery validation server in accordance with claim 11, wherein the network information includes a one-time use passcode to access the wireless network.

15. The delivery validation server in accordance with claim 11, wherein the network information includes an Internet Protocol (IP) address associated with at least one of the user computer device, a cardholder router, and a wireless access point and wherein the method further comprises validating the delivery address based on the IP address.

16. The delivery validation server in accordance with claim 15, wherein the IP address associated with the user computer device is captured in an authentication process for a payment card transaction associated with the online order.

17. At least one non-transitory computer-readable storage media having computer-executable instructions embodied thereon, wherein when executed by a delivery validation server having at least one processor coupled to at least one memory device, the computer-executable instructions cause the processor to:

receive an online order originating from a user computer device, wherein the online order includes a delivery address and network information for a wireless network associated with the delivery address;

configure a delivery device to communicate with the wireless network associated with the delivery address by transmitting the network information and the delivery address from the delivery validation server to the delivery device, wherein the delivery device is configured to travel to the delivery address and connect to the wireless network associated with the delivery address using the network information included in the online order and transmitted from the delivery validation server to the delivery device; and receive, from the delivery device, a delivery confirmation message transmitted through the wireless network associated with the delivery address, wherein the delivery confirmation message is transmitted from the delivery device to the wireless network and routed from the wireless network to the delivery validation server via the Internet and wherein the delivery confirmation message includes routing information indicating that the delivery confirmation message was transmitted through the wireless network, thereby confirming that the delivery device connected to the wireless network using the network information included in the online order and transmitted from the delivery validation server to the delivery device.

18. A method for validating delivery in an automated delivery system, said method implemented using a delivery device including at least one processor in communication with a memory, wherein the delivery device includes a wireless module configured to connect to Wi-Fi networks and transmit messages, said method comprising:

receiving, from a delivery validation server, delivery information for a package to be delivered, the delivery information including a delivery address and network information for a wireless network associated with the delivery address, wherein the network information received from the delivery validation server is previously received at the delivery validation server as part of an online order originating from a user computer device;

configuring the wireless module to communicate with the wireless network based on the network information included in the online order and received at the delivery device from the delivery validation server;

receiving the package for delivery to the delivery address;

travelling to the delivery address;

scanning for one or more wireless signals associated with the wireless network based on the network information;

connecting, via the wireless module, to the wireless network associated with the wireless signal based on the network information;

delivering the package at the delivery address; and transmitting, via the wireless module through the wireless network, a delivery confirmation message to the delivery validation server, wherein the delivery confirmation message is transmitted from the delivery device to the wireless network and routed from the wireless network to the delivery validation server via the Internet, and wherein the delivery confirmation message includes routing information indicating that the delivery confirmation message was transmitted through the wireless network, thereby confirming that the delivery device connected to the wireless network using the network information included in the online order and received at the delivery device from the delivery validation server.

19. The method in accordance with claim 18, further comprising:

receiving at least one wireless signal associated with the wireless network;

determining a strength of the wireless signal; and validating the delivery address based on the strength of the wireless signal exceeding a predetermined threshold.

20. The method in accordance with claim 18, further comprising:

determining a current location of the delivery device;

determining a distance between the current location and the delivery address; and scanning for one or more wireless signals based on the determined distance.

21. An automated delivery system, said system comprising:

a delivery validation server comprising at least one processor in communication with at least one memory; and a delivery device comprising:

at least one processor in communication with at least one memory;

a wireless module configured to connect to wireless networks; and a transportation means configured to transport a package to a location, wherein said delivery validation server is configured to:

receive an online order originating from a user computer device, wherein the online order includes a delivery address and network information for a wireless network associated with the delivery address, and wherein the network information enables the delivery device to communicate with the wireless network;

transmit, to the delivery device from the delivery validation server, delivery data including the network information included in the online order and the delivery address; and receive, from the delivery device, a delivery confirmation message transmitted through the wireless network associated with the delivery address, wherein the delivery confirmation message is transmitted from the delivery device to the wireless network and routed from the wireless network to the delivery validation server via the Internet, and wherein the delivery confirmation message includes routing information indicating that the delivery confirmation message was transmitted through the wireless network, thereby confirming that the delivery device connected to the wireless network using the network information included in the online order and transmitted from the delivery validation server to the delivery device, and wherein said delivery device is configured to:
receive, from the delivery validation server, delivery data for the online order;
configure the wireless module based on the network information;
receive a package for delivery to the delivery address;
travel to the delivery address;
scan for a wireless signal associated with the wireless network based on the network information;
connect, via the wireless module, to the wireless network associated with the wireless signal based on the network information;
deliver the package at the delivery address; and
transmit, via the wireless module through the wireless network, a delivery confirmation message to the delivery validation server.

* * * * *